April 4, 1939.  E. C. McFARLANE ET AL  2,152,810
ROTARY PLUG VALVE
Filed Nov. 1, 1937  4 Sheets-Sheet 2
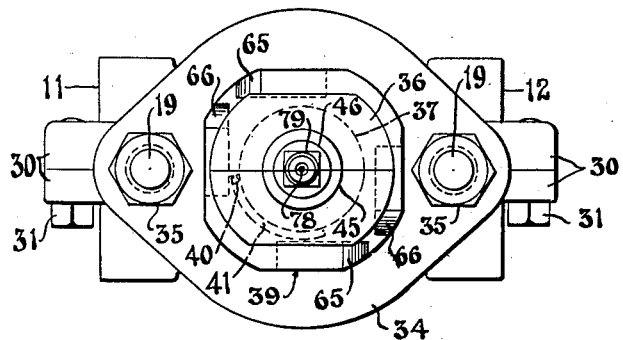
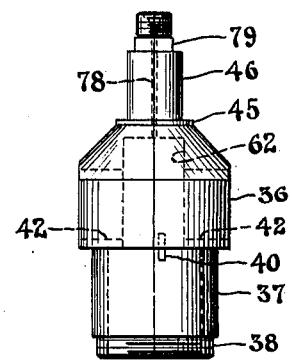
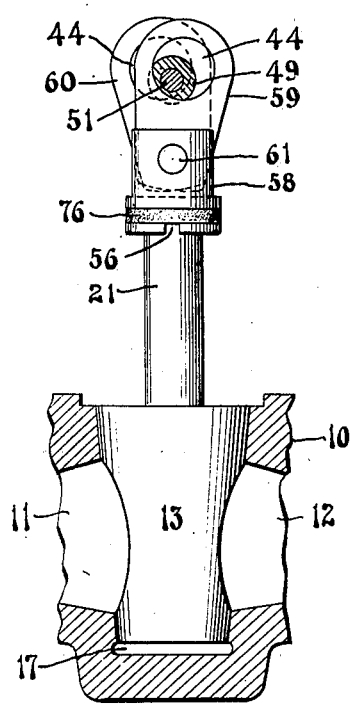
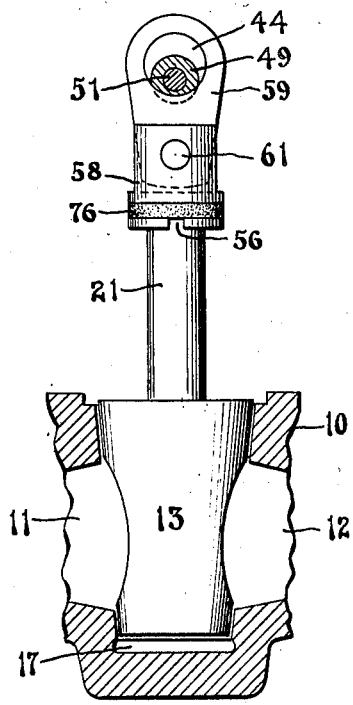
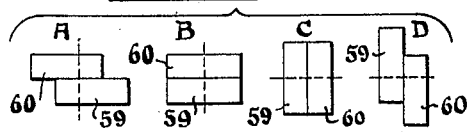
INVENTORS
Edwin C. McFarlane
Edward Levy
BY
ATTORNEY

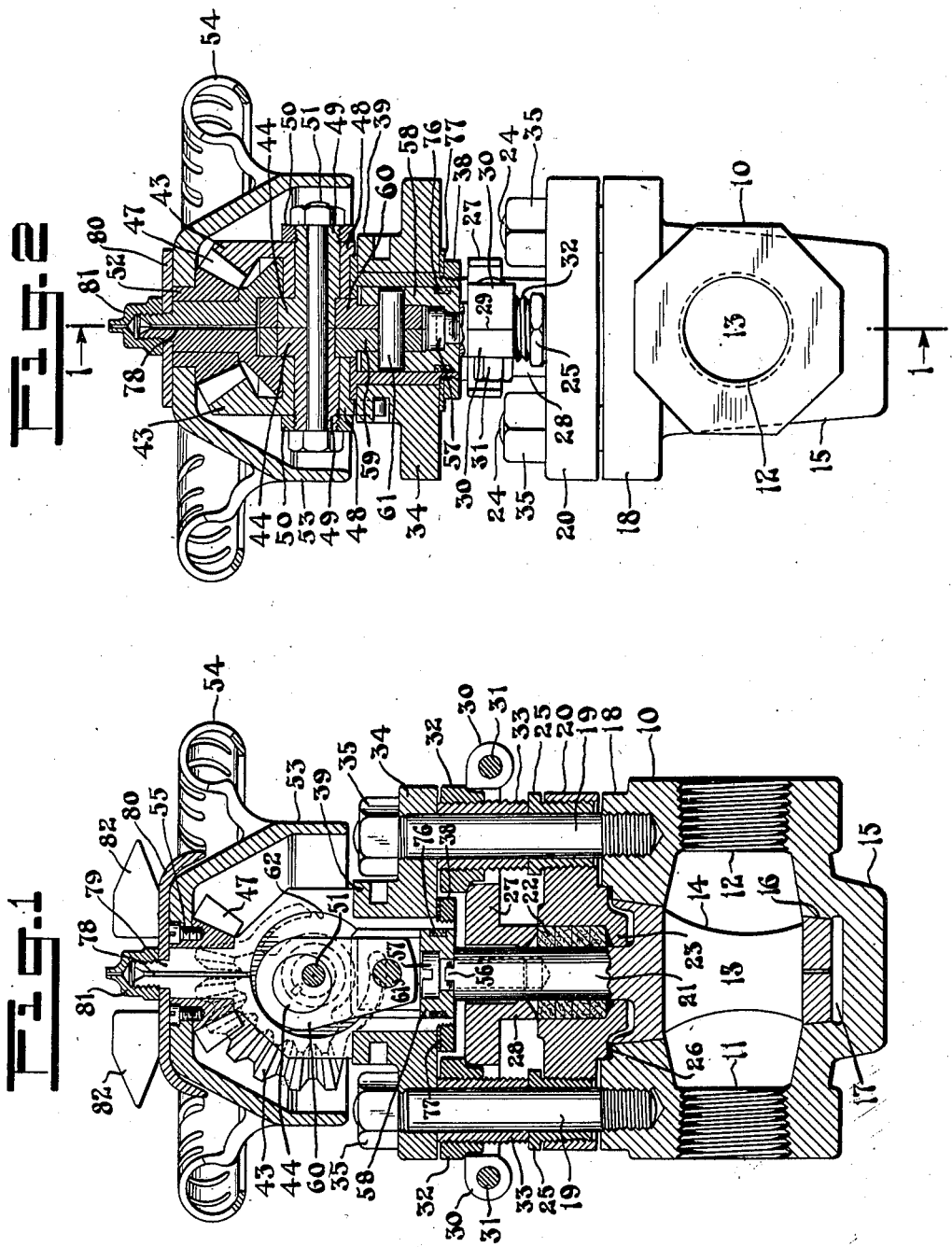

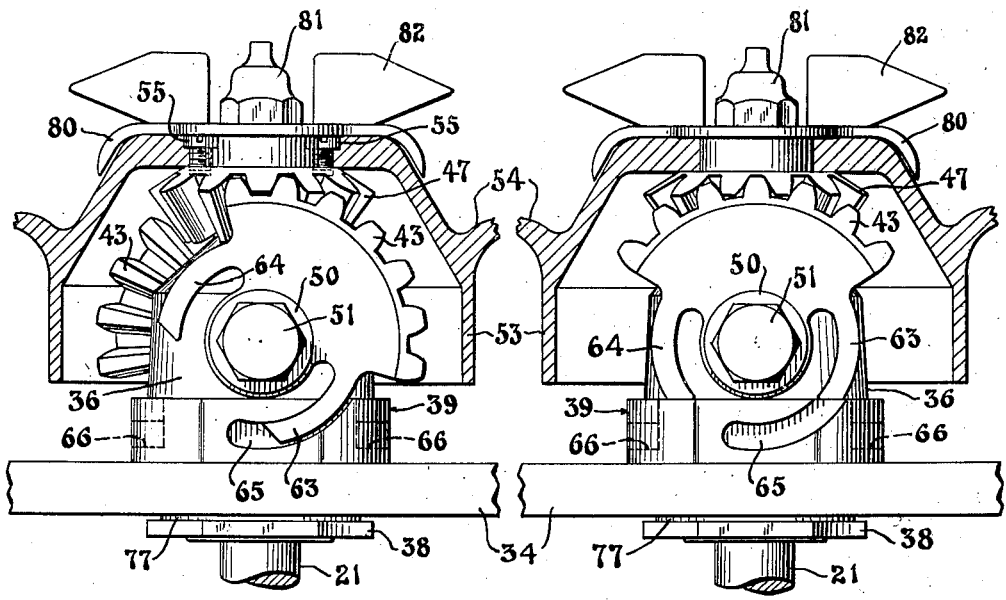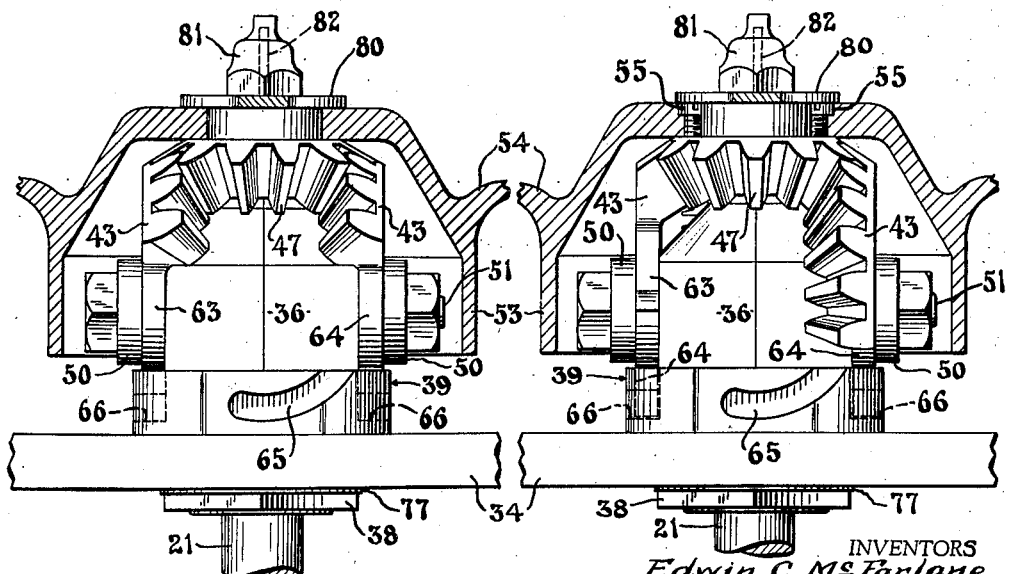

April 4, 1939.  E. C. McFARLANE ET AL  2,152,810
ROTARY PLUG VALVE
Filed Nov. 1, 1937  4 Sheets-Sheet 4
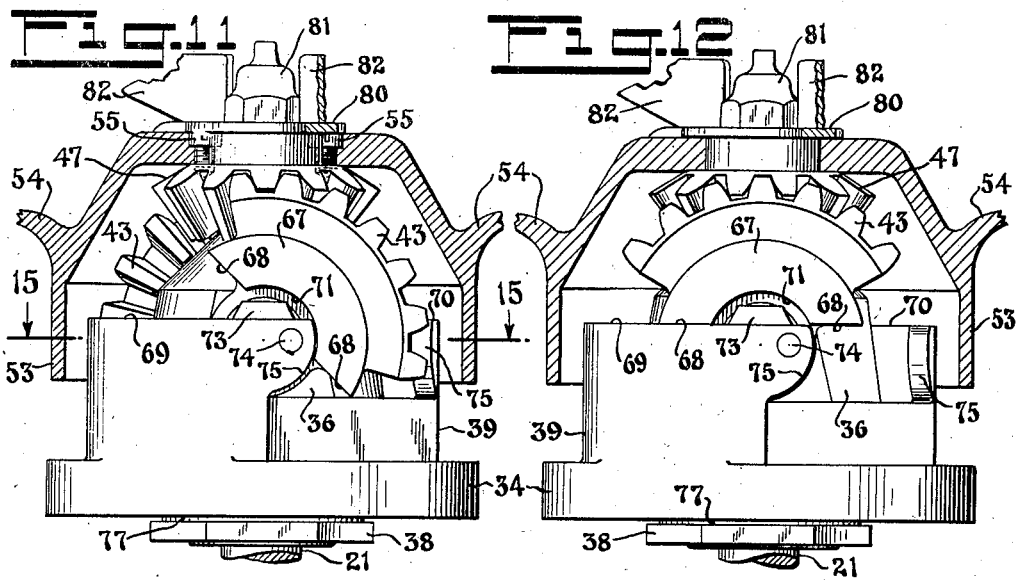
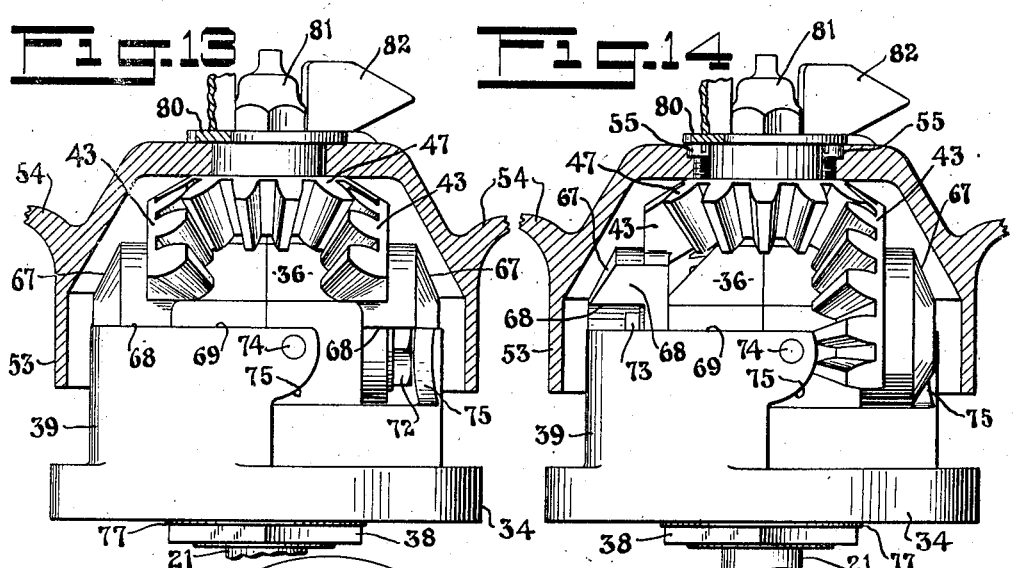
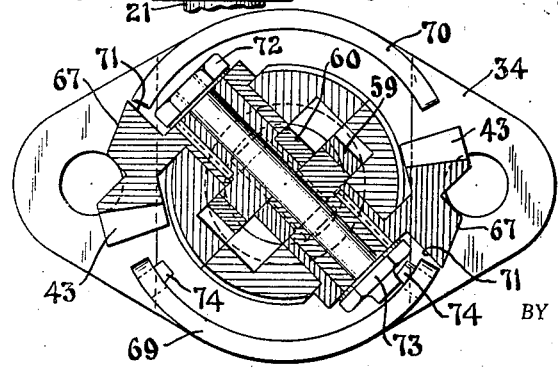
INVENTORS
Edwin C. McFarlane
Edward Levy
BY
ATTORNEY.

Patented Apr. 4, 1939

2,152,810

UNITED STATES PATENT OFFICE 2,152,810

ROTARY PLUG VALVE

Edwin C. McFarlane, Pearl River, and Edward Levy, New York, N. Y., assignors to McLevy Valve Co. Inc., New York, N. Y., a corporation of New York Application November 1, 1937, Serial No. 172,072

8 Claims. (Cl. 251—97)

This invention relates to rotary plug valves in which a tapered plug-cock is designed to be unseated before rotating same to open or close the valve ports and to be reseated after the cock has been rotated. Various devices have heretofore been devised for accomplishing these movements, in some of which, separate operating means are provided for the two movements, and in others a single operating lever or handle is provided, but requiring two different movements to accomplish the unseating and reseating and rotation of the plug-cock.

The main object of this invention is to provide a rotary plug valve having a single operating lever, handle or wheel and an operative connection between same and the plug stem for imparting both rectilinear and rotary movements to the plug-cock by a single, and preferably continuous, rotary movement of the operating lever in one direction in opening and closing the valve, and whereby the plug-cock is first lifted to unseat it without rotary movement thereof, then rotated without rectilinear movement thereof to open or close the valve, and then depressed to reseat the plug without rotary movement thereof.

In carrying this object into effect we provide between the plug stem and operating lever a toggle-link connection actuated by a pair of eccentrics which are rotated by a gear connection with the operating lever. It is essential that the rectilinear movement of the plug-cock and its stem be imparted thereto without lateral thrust and this is accomplished by the toggle-link connection whereby uniform angular pull or pressure is applied axially to the stem from opposite sides of the axial center. To change from the rectilinear movement imparted to the stem and plug to rotary movement thereof we provide means for locking the gear connection at a predetermined point so that when the plug has been raised from its seat the desired distance the operating connection between the lever and eccentrics is locked to prevent further rotation of the gears and thereby impart rotary movement to the stem and plug, and when the full rotary movement is imparted to the plug, the geared connection is unlocked to again impart rectilinear movement to the stem to reseat the plug.

Our invention involves other features of improvement in rotary plug valves as shown in the accompanying drawings, in which,—

Figure 1 is a vertical central section on the line 1—1 of Figure 2.

Figure 2 an end elevation and partial vertical central section.

Figure 3 a plan view with the operating handwheel and plug operating gear removed to show a top view of the gear turret and part of the locking means.

Figure 4 an elevation of the turret for the eccentrics and gearing.

Figures 5 and 6 detail views illustrating the relative positions of the toggle-links, eccentrics and plug in the seated and unseated positions of the plug.

Figure 7 an elevation and partial section of the plug operating mechanism showing the relative positions of the parts when the valve ports are either open or closed and the plug-cock seated.

Figure 8 a similar view illustrating the positions when the plug-cock is unseated preparatory to imparting rotary movement thereto for opening or closing the ports.

Figure 9 a similar view illustrating the positions when the plug-cock has been rotated to the full open or closed position preparatory to imparting rectilinear movement to the stem for reseating the plug-cock.

Figure 10 a similar view illustrating the positions of the parts of the operating mechanism when the plug-cock is in the open or closed and reseated position.

Figures 11, 12, 13 and 14 are views similar to Figures 7 to 10 of a modified locking means.

Figure 15 a horizontal cross-section on the line 15—15 of Figure 11, and

Figure 16 a diagrammatic illustration of the relative positions of the toggle-links during the operation of the valve.

Referring to the drawings, and more particularly to Figures 1 and 2, 10 indicates the usual valve casing and 11—12 the inlet and outlet ports. These ports may, as indicated, be screw threaded to receive screw threaded pipe, or may be provided with flanges for coupling to flanged coupling members. The casing has a vertical central bore to receive a tapered rotary plug 13 having a port 14 to provide a straight line flow through the valve. In order to allow for proper grinding of the plug seat, the hub of the casing is cast with a downward bulge 15 within which is the lower circular face 16 of the plug seat and providing a recess 17 for clearance of the grinding tool and for the proper seating of the plug within the tapered bore. At the top, the casing is enlarged to form a flange 18 which is drilled and tapped to receive bolts or studs. At opposite ends of the casing directly over the ports the tapped holes receive stud bolts 19. Sleeved on studs 19 is a bonnet 20 having a central opening through which plug stem 21 passes and within which opening packing 22 is packed against seat 23 at the underside of the bonnet. The bonnet is provided with holes for the stud bolts 24 and the two holes through which the stud bolts 19 pass are threaded to receive nipples 25. The top of the casing flange 18 has a circular recess to receive gasket 26 on which the circular bonnet base is seated so that when the bonnet is clamped in position by nuts on stud bolts 24 and nipples 25 the casing is sealed at that point. Sleeved on the plug stem 21 is a packing yoke 27 having a gland 28 which is adapted to slide within the cylindrical bore of the bonnet to compress the packing 22 upon its seat and around the plug stem. Yoke 27 is split vertically into two similar halves, as indicated by line 29 in Figure 2, to permit assembly on the stem 21 and stud bolts 19. The two halves of the yoke are provided with ears 30, the ears on one half being bored to receive bolts 31 and the other half being bored and threaded whereby the two halves are clamped together by the bolts when placed in position on the plug stem and stud bolts. The arms of the yoke are recessed to form circular seats for collar-nuts 32 which are threaded on nipples 33 and by means of which the packing yoke is driven down to compress the packing. To renew the packing, nuts 32 are threaded upward to the position shown in Figure 1 and in which position the yoke may be separated by removing bolts 31 and entirely removed. This construction permits reduction in the height of the valve structure and affords free and ample space to renew the packing. The position of these parts as seen in Figure 1 represent the yoke in its initial position after assembly on the stem and studs and before the packing 22 is subjected to pressure by the gland. The nipples 33 are sleeved on the stud bolts 19 and seated on pipples 25, and seated on nipples 33 is a mechanism yoke 34 which is secured in position by nuts 35 which firmly clamp the nipples 33 between the yoke and bonnet nipples 25 and hold same against turning on the stud bolts.

The mechanism yoke 34, shown in plan view Figure 3, has a cylindrical bore in which turret 36 is journalled. The turret is formed in two similar halves as shown in Figure 4, with a cylindrical section 37 of reduced diameter to form the turret journal having a cylindrical bore, and a reduced threaded section to receive hexon nut 38 which is screwed against the shoulder of the journal 37 to retain the turret in position without binding on the yoke. The turret is rotatably seated on the hub 39 of the yoke 34 and is free to rotate ninety degrees in either direction, the movement being limited by stop pin 40 projecting downward from the turret seat into recess 41 at the upper edge of the hub 39. The periphery of the turret is machined to form parallel flats as seen in Figure 3, and the turret is bored perpendicularly to these flats to form bearings 42 shown in dotted lines in Figure 4 for bevel sector gears 43 and eccentrices 44 hereinafter referred to in detail. The upper part of the turret is formed into a truncated cone terminating in cylindrical sections 45 and 46 to form a seat and journal for bevel pinion 47 which meshes with the bevel sector gears 43, see Figures 1 and 2.

The bevel sector gears 43 are ninety degree sectors having inwardly projecting hubs 48 which are journalled in the turret bearings 42 as best seen in Figures 2 and 15. The hubs 48 are bored cylindrical and concentric with the bearing surfaces and sleeved within the bore of the hubs and keyed thereto are the elongated hubs 49 of eccentrics 44 and which project through the gear hubs 48 and are screw threaded to receive nuts 50 which are adjusted on hubs 49 to lock the hubs of the sector gears and eccentrics in the proper relative positions. The hubs of the eccentrics are bored concentric to hubs 48 to receive bolt 51, the head and nut of which are drawn up tight against nuts 50 thereby serving as a lock for nuts 50 and for maintaining sector gears 43 and pinion 47 in proper mesh. Pinion 47 is rotatively sleeved on journal 46 of the turret and is provided with a hub 52 on which the hood 53 forming part of the operating hand-wheel 54 is seated and to which the hood is rigidly attached as by screws 55 shown in Figure 1. The purpose of hood 53 is to cover and protect the sector gears. From the description of the pinion, sector gears and eccentrics as mounted on the turret, it will be observed that rotation of the hand-wheel in either direction causes rotation of the sector gears and eccentrics, and that since the sector gears will be caused to rotate in opposite directions, the eccentrics rotating with the sector gears will also rotate in opposite directions.

The upper end of the plug stem 21 is provided with a pair of splines 56 and is drilled and tapped to receive headed screw 57 for rigidly connecting stirrup 58 to the stem. The stirrup is cylindrical in shape and has a spline slot to engage stem splines 56 and is drilled and counter-bored to receive screw 57. The stirrup is also slotted and drilled to receive the toggle-links 59 and 60 and pivot pin 61. The stirrup has a sliding fit in the cylindrical bore of the turret journal 37 and the height of the stirrup is such as to leave a slight clearance at the top when in its extreme upward position. The toggle-links 59—60 are flat-sided pieces of a thickness to have a working fit between the sides of stirrup 58 and are drilled to receive pivot pin 61. The upper or swinging ends of the toggle-links are bored to receive the eccentrics 44 with a close working fit and are slightly larger and somewhat thicker than the pivot ends and have a working fit between the walls of the circular cavity 62 formed in the turret, Figure 4. The cavity 62 is eccentric to the axis of the sector gears and of sufficient diameter as seen in Figure 1 to afford clearance for the toggle-links when moved outward and upward by the eccentrics.

In the seated open position of the plug-cock as seen in Figures 1 and 5, the toggle-links due to the opposite rotation of the eccentrics, are moved outward from the axial center of the stem 21 as seen in Figure 5, and the movement of the links into this position effects the downward pressure on the stem to seat the plug-cock and hold it in the seated position. Upon rotation of the hand-wheel in a clockwise direction, the right hand sector gear 43, Figure 2, is rotated in a clockwise direction, as viewed from the left of Figure 2, and the left hand gear rotates counterclockwise. This action rotates the eccentrics in corresponding directions and causes the toggle-links to move toward each other from the position of Figure 5 to the position of Figure 6. This movement exerts an upward pull on the stem and plug uniformly from two equidistant opposite points toward the axial center of the stem 21 and draws the stem and plug upward without lateral thrust to free the plug from its seat, the clearance between the plug and seat as seen in Figure 6 being exaggerated to more clearly illustrate the unseating of the plug. This action is quite rapid and takes place before the operating gears and eccentrics are locked against further rotation on their axes to change the rectilinear movement of the stem and plug to rotary movement thereof to open or close the valve.

In the operation of the toggle-links by the eccentrics to effect the seating or unseating of the plug-cock it will be noted by reference to Figures 5 and 6 that in the fully seated position of the plug the toggle-links are moved outward from the axial center of the stem as far as the firm seating of the plug will permit and that this occurs when the sector gears are in the unlocked position as illustrated in Figure 7. In this position the rotation of the hand-wheel and sector gears is arrested when the plug is firmly seated. The upward movement of the stem in unseating the plug is limited by the length of the toggle-links and when the eccentrics are in the central position as seen in Figure 6 the limit of upward movement is reached, and in accordance with the assembly of the eccentrics with the sector gears this occurs when the sector gears are locked against further rotation preparatory to imparting rotary movement to the stem to open or close the valve.

To lock the reciprocating mechanism at the predetermined point preparatory to imparting rotary movement to the stem and plug, a lock for the sector gears 43 is provided in the form of a pair of arcuate hooks 63—64 on each sector gear, which may be formed integrally with the sector gears, and two pairs of co-operating arcuate slots 65—66 cut into the hub 39 of yoke 34 on a downward curve from the face of the hub as best seen by comparison of Figures 3 and 7. It will be noted that the hooks are of equal length or arc and that the curve of the hooks and slots is concentric with the axis of the sector gears. It will also be noted that the turret is of less diameter than the hub 39 on which it is seated and that this diameter is decreased by the flats at the axis of the sector gears so that the hooks of the sector gears will be free to move either into or out of the slots or ride on the face of the hub. It will also be noted that the entrance to the slots are at diametrically opposite points so that when the sector gears rotate clockwise hooks 63 will simultaneously enter slots 65, and when rotated counterclockwise hooks 64 will likewise simultaneously enter slots 66, and that during the interval between the periods of entry both pairs of hooks will ride on the face of hub 39 and lock the sector gears and pinion against relative rotation. In the locking position of hooks 63—64, the turret 36, sector gears 43, pinion 47 and hand-wheel 54 will be locked together and this locking also prevents rotation of the eccentrics, and therefore, rotation of the hand-wheel will cause the entire operating mechanism to rotate as a unit on the mechanism yoke 34, and by reason of the close fit of the flat sides of the toggle-links within the turret cavity 62 and between the sides of the stirrup, the toggle-links will act as a key between the turret and stirrup to impart the rotary movement of the hand-wheel direct to the stem and plug.

The function of the hooks and slots is to permit rotation of the sector gears and eccentrics in an arc sufficient only to impart the desired rectilinear movement to the stem in seating or unseating the plug-cock. As illustrated in the drawings this rotary movement is approximately forty-five degrees and starts with the starting of rotation of the hand-wheel, and when the sector gears have rotated sufficient to withdraw the pair of diametrically opposite hooks from their slots, the other pair of diametrically opposite hooks will move simultaneously into contact with the face of the hub and lock the sector gears against further rotation. This locking of the sector gears against rotation on their axes effects the locking of pinion 47 against rotation on its axis and likewise locks the eccentrics against further rotation as above described.

In Figure 7 which illustrates the position of sector gears 43 corresponding to the position of eccentrics 44 in Figure 5, and in which position the plug-cock is in the open and seated position, the hand-wheel has reached the limit of its rotation due to the firm seating of the plug-cock. To close the valve the hand-wheel is rotated clockwise, thereby through pinion 47 rotating sector gears 43 through an arc of forty-five degrees to the position shown in Figure 8. This movement as shown withdraws the diametrically opposite pair of hooks 63 from slots 65 and moves hooks 64 into contact with the face of hub 39 and thereby preventing further rotation of the sector gears. During this rotation of the sector gears the eccentrics 44 will have rotated in a like arc of forty-five degrees from the position of Figure 5 to the position of Figure 6, the toggle-links having shifted from position A, Figure 16, to position B, and thus imparting the full upward rectilinear movement to the stem 21 and unseating the plug-cock. As above stated this rotation of the sector gears into the locked position locks the entire operating mechanism and during the continued clockwise rotation of the hand-wheel, without interruption, the entire operating mechanism including the turret will rotate on the mechanism yoke to the position shown in Figure 9, i. e., a ninety degree rotation from the position of Figures 6 and 7, and thereby rotating the stem and plug to the closed position, but with the plug still in the unseated position, and likewise turning toggle-links 59—60 to the position C, Figure 16. This rotary movement places the diametrically opposite locking hooks 64 over the entrances to the slots 66 thereby unlocking the sector gears, which, by the continued rotation of the hand-wheel, without interruption, in the same direction, will resume their rotary movement in the same direction as at starting due to the hooks 64 being free to enter slots 66. This action causes the eccentrics 44 to resume rotation in the same direction as at starting from position of Figure 5, and which having been held against angular movement in the position of Figure 6 during the rotation of the plug, and the toggle-links having turned with the plug stem to the position indicated at C, Figure 16, the links will not resume angular movement in the same direction as the first half of the movement and shift the relative positions from position C to position D. This movement of the toggle-links applies downward pressure to the plug stem to reseat the plug-cock after its rotation to the closed position. The sector gears and locking hooks will now be in the position shown in Figure 10 which is the position opposite to that of Figure 7 and the relative angular positions of the eccentrics and toggle-links will be that of Figure 5, except that the links will be on the opposite side of the axial center of the stem 21 as indicated at D in Figure 16.

To re-open the valve the operating hand-wheel is turned counterclockwise thereby reversing the order of operation starting from the position of Figure 10 back to the position of Figure 7. In this movement the toggle-links are moved from position D to position C, Figure 16, to unseat the plug, and by continued uninterrupted rotation of the hand-wheel while the gear mechanism is locked, the plug stem is rotated to open the valve and simultaneously turning the toggle-links to the position indicated at B, Figure 16, whereupon the gear mechanism is unlocked and the eccentrics will again operate the links and bring them back to the position of Figure 5 and A of Figure 16, reseating the plug-cock.

From the foregoing description of the valve operation it will be seen that by a continuous rotary movement of the operating hand-wheel in one direction, rectilinear movement is first imparted to the plug stem, without rotation thereof, to unseat the plug; then the plug-cock is rotated to open or close the valve, without rectilinear movement of the plug; and then rectilinear movement is imparted to the stem, without rotary movement thereof, to reseat the plug. The extent of rotation of the hand-wheel in one direction to accomplish these movements will depend upon the gear ratio between the sector gears and the hand-wheel pinion. As illustrated in the drawings this movement is approximately 180 degrees.

In Figures 11 to 15 is shown the modified locking arrangement for the sector gears. In this form the locking hooks and co-operating slots in the hub of the mechanism yoke are dispensed with and instead of the hooks the sector gears are provided with semi-circular hubs 67 having contact faces 68 which engage the vertical flanges 69 and 70 projecting above the hub 39 of the mechanism yoke 34. The hubs 67 are bevelled as seen in Figures 13 and 14 so as not to contact with the hood 53 and are recessed as shown at 71 to serve as counter-bores for the head and nut of bolt 72 which serves the same purpose as bolt 51 in Figure 2, but in this form the hubs of the eccentrics do not project beyond the hubs of the sector gears as in Figure 2 and the nuts 50 are therefore dispensed with. The nut 73 for bolt 72, see Figure 15, is turned down to form a hub which engages with stop pins 74 projecting inward from locking flange 69 and which stops serve the same purpose as pin 40 and recess 41 shown in Figures 3 and 4. Flanges 69 and 70 form arcs of approximately 120 degrees to provide opposite spaces of approximately 60 degrees into which the sector gears pass from the locked position as seen in Figures 11, 14 and 15. In order that the gear hubs 67 may readily turn from the locked position, flanges 69 and 70 at each end are undercut to provide arcs 75 concentric with the axis of the sector gears and hub recesses 71 so that as the forward moving contact ends 68 of the hubs slide off the ends of flanges 69 and 70 to unlock the sector gears the rotation will not be impeded as they resume rotation with the continued rotation of the operating hand-wheel and permit them to turn down freely into the clearance between the ends of the flanges 69 and 70.

The operating steps of this form of operating mechanism are identical with the steps in the operation as illustrated in Figures 7 to 10. In Figure 11 the parts are in the position assumed when the valve is open and the plug-cock seated as in Figure 5. With the clockwise turning of the hand-wheel the eccentrics are caused to rotate to unseat the plug until the forward moving faces 68 of the gear hubs 67 contact the flanges 69 and 70 as shown in Figure 12. This arrests the rotation of the sector gears and causes the operating mechanism to lock for imparting the rotary movement to the plug stem. The continued uninterrupted turning of the hand-wheel rotates the gear mechanism and the turret to the position of Figure 13 at which time the plug-cock will have rotated ninety degrees to the full closed position, whereupon, the forward ends 68 of the hubs 67 will ride off the flanges 69 and 70 and permit the sector gears to resume rotation by tilting down into the clearances as shown in Figure 14 until the firm re-seating of the plug in the closed position arrests the further turning of the gears and hand-wheel.

The stirrup 58, see Figures 1 and 2, is provided with a circumferential groove for a packing ring 76, and a gasket 77 is sleeved on the threaded end of the turret journal between the shoulder and retaining nut 38 to prevent leakage of lubricant. The journal sections 46 of the turret are grooved as shown at 78 to form a feed tube for a lubricant, and the upper end of the journal 46 has a reduced squared section 79 on which indicator plate 80 is seated, and the projecting end of the turret is further reduced and screw-threaded to receive cap-nut 81 which secures the indicator plate in position and caps the inlet for the lubricant. The indicator plate has a pair of pointers 82 which are set in alignment with the line of flow through the valve ports as seen in Figure 1 and which pointers turn with the rotation of the turret to indicate the open and closed positions of the plug-cock.

In the structure as illustrated in Figure 2 the valve parts are assembled in the following manner. Stud bolts 19 and 24 are screwed into casing flange 18 preparatory to placing the bonnet in position. The plug-cock is inserted into its seat and the bonnet is sleeved on the plug stem 21 and seated on gasket 26 with the bolt holes registering with stud bolts 19 and 24. Nipples 25 and the nuts for bolts 24 are then threaded in position to clamp the bonnet to the casing. Nipples 33 with collar-nuts 32 threaded thereon are then sleeved on stud bolts 19. Stirrup 58 is now secured in position on the stem and toggle-links 59—60 are then placed in the stirrup and pivot pin 61 inserted. The two halves of the turret 36 are assembled on the mechanism yoke 34 and secured in position by gasket 77 and nut 38. The mechanism yoke with the turret mounted thereon is then placed in position to register with stud bolts 19, the toggle-links and stirrup sliding upward into the turret to a position where the eccentric bearings register with the sector gear bearings 42 in the turret, and then the eccentrics are inserted through bearings 42 and into the toggle-links. The hubs of the sector gears 43 are then inserted into bearings 42 with the keys on the eccentric hubs 49 entering the key slots in the gear hubs. Nuts 50 are then screwed onto hubs 49 to adjust the eccentrics and gears on the turret, and then bolt 51 is placed in position and its nut screwed up tight to lock nuts 50 in the adjusted positions. The plug stem and operating mechanism, minus the hand-wheel and pinion 47, being thus assembled and the bonnet in position on the casing, nuts 35 are threaded onto stud bolts 19 to clamp the mechanism yoke firmly in position. The nuts on bolts 24 are then screwed down tight and nipples 25 screwed upward to tighten the bonnet on its seat. The packing 23 may now be inserted and then gland yoke 27 is assembled on the stem and stud bolts 19 and the packing compressed by screwing down collar-nuts 32. The hand-wheel with its pinion 47 is then placed in position on the turret and indicator plate 80 is placed on the turret stem and secured by cap-nut 81.

While we have shown specific forms of mechanism for imparting the successive rectilinear, rotary and rectilinear movements to the plug stem for unseating, rotating and reseating the plug, we do not limit ourselves to this particular mechanism since various modifications of the operating mechanism may be employed without departing from the spirit of our invention, the main object of which is to provide a mechanism whereby through the continuous rotation of a single operating lever or hand-wheel in one direction the successive movements are imparted to the plug stem.

What we claim is:

1. In a valve, the combination of a casing having a plurality of ports, a plug-cock for controlling communication between said ports, an operating stem on said plug, a yoke mounted on said casing, a rotary turret journalled on said yoke, a pair of sector gears journalled on said turret, a pair of eccentrics within the turret and operatively connected with said gears, a pinion journalled on the turret and meshing with said gears, an operating handle for rotating said pinion, a pair of toggle-links pivoted on the plug stem projecting into the turret and operatively connected with said eccentrics and whereby rectilinear movement is imparted to said stem through the rotation of said pinion and gears, and means for locking said gearing against rotation on said turret whereby rotary movement is imparted to said turret and stem.

2. In a valve, the combination of a casing having a plurality of ports, a plug-cock for controlling communication between said ports, an operating stem on said plug, a yoke mounted on said casing, a rotary turret journalled on said yoke, a pair of sector gears journalled on said turret, a pair of eccentrics within the turret and operatively connected with said gears, a pinion journalled on the turret and meshing with said gears, an operating handle for rotating said pinion, a stirrup mounted on the plug stem and having a sliding fit within the turret, a pair of toggle-links pivoted in said stirrup and operatively connected with said eccentrics and whereby rectilinear movement is imparted to said stem through the rotation of said pinion and gears, and means for locking said gearing against rotation on said turret whereby rotary movement is imparted to said turret and stem.

3. In a valve as defined in claim 1, a turret formed in two parts with a reduced cylindrical section journalled in the supporting yoke and threaded to receive a retaining nut, and cavities in said parts within which the toggle-links have a working fit and whereby said links together serve as a key to impart rotary movement from the turret to the plug stem.

4. In a valve, the combination of a casing having a plurality of ports, a plug-cock for controlling communication between said ports, an operating stem on said plug, a single operating handle mounted for movement about the axis of said stem, an eccentric means operatively coupled to said stem for imparting rectilinear movement thereto, gearing between said eccentric means and handle for operating said means to convert the angular movement of the handle into rectilinear movement of the stem, means for locking said gearing against rotation to lock the handle to the stem for imparting directly the angular movement of the handle to the stem, and means for releasing said gearing to unlock the handle from the stem and re-establish the operative connection for converting the angular movement of the handle into rectilinear movement of the stem, whereby the movement of said handle in one direction imparts successively rectilinear, rotary and rectilinear movement to said stem to unseat, rotate and reseat the plug cock.

5. In a valve, the combination of a casing having a plurality of ports, a plug-cock for controlling communication between said ports, an operating stem on said plug, a yoke mounted on said casing, a gear carrying member mounted for rotary movement on said yoke, a single operating handle mounted on said member for rotation about the axis of said stem, gearing journalled on said member and the driving element of which is operatively connected with said handle, an eccentric journalled in said member and operatively connected between said gearing and stem whereby through the angular movement of the handle rectilinear movement is imparted to the stem, and means for locking the gearing to impart through said gear carrying member rotary movement to the stem and plug.

6. In a valve, the combination of a casing having a plurality of ports, a plug-cock for controlling communication between said ports, an operating stem on said plug, a yoke mounted on said casing, a gear carrying member mounted on said yoke, a single operating handle mounted on said member for rotation about the axis of said stem, gearing journalled on said member and the driving element of which is operatively connected with said handle, an eccentric journalled in said member and operatively connected between said gearing and stem whereby through the angular movement of the handle rectilinear movement is imparted to the stem, means for locking said gearing against rotation at an intermediate point in its rotation whereby said handle is locked to said gear carrying member to impart the angular movement of the handle through said gear carrying member to the stem and plug, and means for unlocking said gearing at either end of the cycle to re-establish the operative connection for rectilinear movement of the stem.

7. In a valve, the combination of a casing having a plurality of ports, a plug-cock for controlling communication between said ports, an operating stem on said plug, a yoke mounted on said casing, a gear carrying member mounted for rotary movement on said yoke, gearing journalled on said member, an operating handle rotatively mounted on said member and operatively connected with one element of said gearing, a hood forming part of said handle for covering said gearing, an eccentric journalled in said gear carrying member and operatively connected between said gearing and stem whereby through the angular movement of the handle rectilinear movement is imparted to the stem, and means for locking the gearing to lock the handle to said gear carrying member to impart through said member rotary movement to the stem and plug.

8. In a valve as defined in claim 5, a gear locking means comprising projections on the gearing adapted to engage with the supporting yoke to hold the gearing against rotation during part of the rotary movement of the operating handle, and recesses in the supporting yoke into which said projections enter at both ends of the cycle to release the gearing.

EDWARD LEVY.
EDWIN C. McFARLANE.